United States Patent

[11] 3,621,881

[72] Inventor Felix J. Vicari
Houston, Tex.
[21] Appl. No. 60,497
[22] Filed Aug. 3, 1970
[45] Patented Nov. 23, 1971
[73] Assignee ACF Industries, Incorporated
New York, N.Y.

[54] HIGH-LOW PRESSURE PILOT VALVE MECHANISM
11 Claims, 3 Drawing Figs.

[52] U.S. Cl. ................................................. 137/625.66,
137/458, 251/28
[51] Int. Cl. ........................................................ F16k 11/07,
F16k 31/12
[50] Field of Search ............................................. 137/458,
625.66, 488, 492.5, 529, 538, 542, 543, 624.27,
625.17, 625.6, 637.2, 625.68, 625.69; 251/28

[56] References Cited
UNITED STATES PATENTS
2,781,053  2/1957  Berninger et al. ............  137/492.5
3,026,904  3/1962  Dollison ........................  137/458 X
3,083,726  4/1963  Woelfel ........................  137/458

*Primary Examiner*—M. Cary Nelson
*Assistant Examiner*—Robert J. Miller
*Attorney*—James L. Jackson ABSTRACT: A high-low pressure pilot valve mechanism according to the present invention, comprises a single valve body having a valve chamber with an elongated spool valve element disposed for reciprocation therein. The valve body includes controlled fluid inlet and outlet passages disposed in fluid communication with the valve chamber and are communicated through a passage formed in the valve element when the valve element is located at the operating position thereof. The valve body is provided with exhaust ports in fluid communication with the valve chamber, which ports allow bleeding of pressurized control fluid to the atmosphere when the valve element is disposed in position other than the operating position thereof. Valve actuation is accomplished by a pair of concentric pistons that impart movement to the valve element against the bias of a pair of adjustable compression springs responsive to sensed fluid pressure introduced through a pressure-sensing inlet defined by the valve body. The compression spring and pistons cooperate to move the valve element to a first position in the event the sensed fluid pressure is below an operating pressure range, thereby blocking the flow of pressurized control fluid at the control fluid supply inlet and communicating the control fluid outlet with one of the exhaust ports. One of the compression springs is overcome when the sensed pressure is within a predetermined operating range allowing the valve element to move to a second position communicating the control fluid inlet and outlet and blocking the exhaust ports. Both of the compression springs are overcome upon sensing of pressure above the operating pressure range, thereby allowing movement of the valve element to a third position where the control fluid inlet is blocked and the control fluid outlet is communicated with one of the exhaust ports.

FELIX J. VICARI
INVENTOR.

BY James D Jackson
ATTORNEY

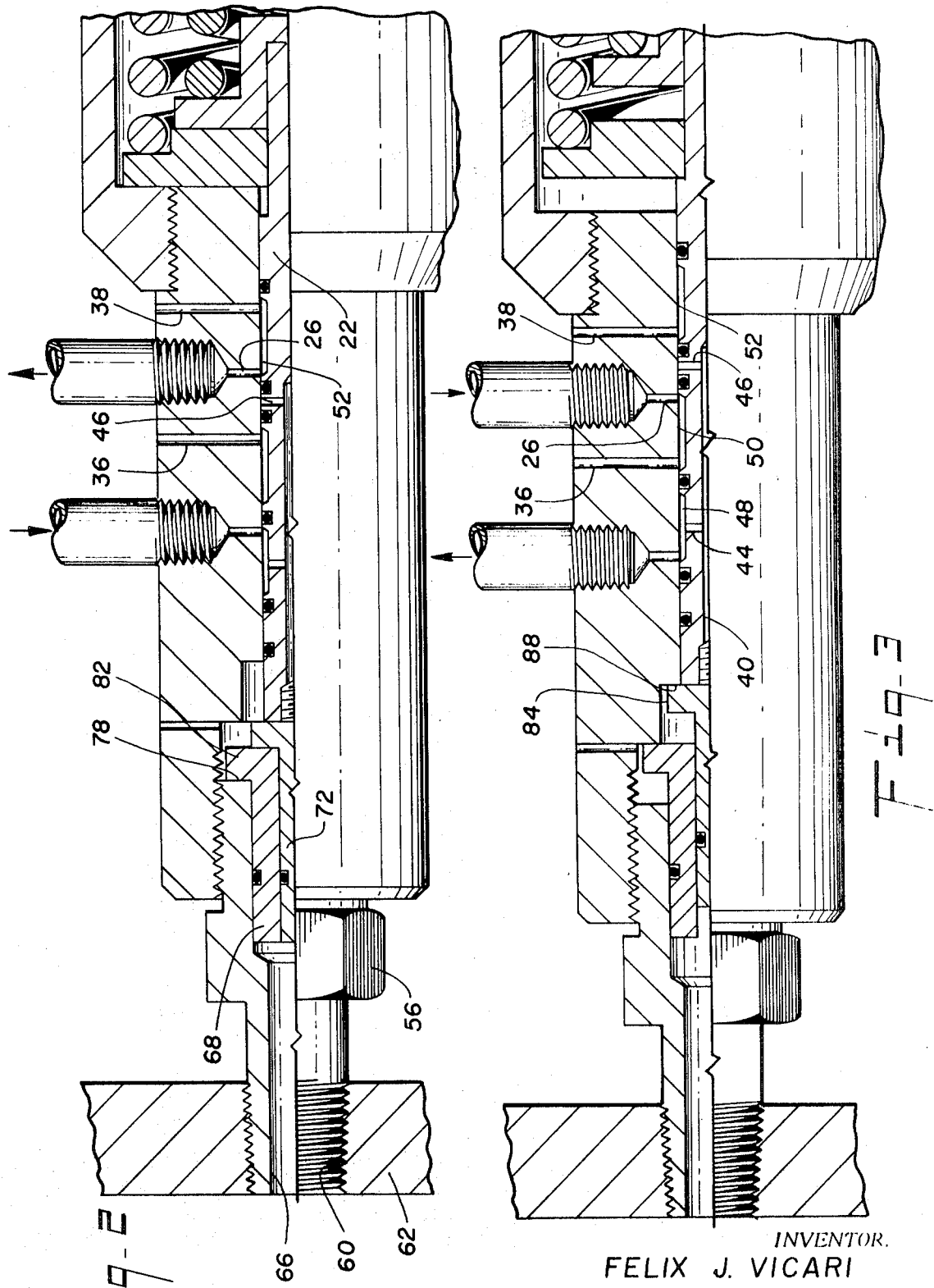

3,621,881

HIGH-LOW PRESSURE PILOT VALVE MECHANISM

BACKGROUND OF THE INVENTION

This invention relates generally to pilot valve structures and more particularly to a pilot valve structure capable of controlling the supply of control fluid to a remotely located actuator responsive to a sensed operating pressure range that is neither excessively high or excessively low.

Generally, pilot valve structures are capable of sensing fluid pressures and controlling the supply of control fluid to actuators such an pneumatic valve actuator and the like when the sensed pressure is either below a predetermined maximum or above a predetermined minimum. In order to allow control of actuator supply fluid, it is frequently necessary to provide two separate sensing systems, one being responsive to excessively high pressure and the other being responsive to pressure that is excessively low in order to provide a system that will automatically shut down in the event the sensed fluid pressure either falls below or exceeds an operating pressure range. Combined high-pressure and low-pressure pilot valves have been developed, but such structures are generally quite complicated and are frequently extremely expensive.

Pilot valves are generally of the constant bleed type having an orifice that is larger than a restricted orifice disposed in a supply line through which operating fluid is transmitted to an actuator that is to be controlled. The actuator will remain inoperative until a valve element within the pilot valve is shifted to a position blocking the pilot orifice thereby allowing sufficient pressure buildups in the supply line to energize the actuator. When line fluids such as natural gas are employed to provide an energizing medium for actuators, constant bleed-type pilot valves are considered undesirable because the venting gas presents a fire hazard and tends to pollute the environment.

SUMMARY OF THE INVENTION

The present invention has for an important object the overcoming of the above-mentioned difficulties in the provision of a single pilot valve mechanism that is capable of controlling the flow of control fluid, responsive to a sensed pressure, and blocking the flow of control fluid in the event the sensed fluid pressure should become excessively high or low.

It is a further object of the present invention to provide a novel pilot valve mechanism that does not constantly bleed control fluid while the pilot valve structure is disposed in a condition resulting in maintenance of an associated actuator mechanism in an inoperative condition.

It is an even further object of the present invention to provide a novel pilot valve mechanism that employs compression spring members to determine the operating pressure ranges of the pilot valve.

Among the several objects of the present invention is noted the contemplation of a novel pilot valve mechanism including individual adjustments for the high- and low-pressure ranges that determine the operating pressure range of the pilot valve mechanism.

It is also another object of the present invention to provide a novel pilot valve mechanism that provides for both high- and low-pressure shutdown to move an associated actuator device to a predetermined safe position in the event a dangerous or undesirable condition occurs.

It is also an object of the present invention to provide a novel pilot valve mechanism that is simple in nature, reliable in use and low in cost.

The above and other objects and novel features of the instant invention will be readily apparent from the following description taken in conjunction with the accompanying drawings. It is to be understood that the drawings are provided only for the purpose of illustration and are not intended to define the limits of the invention, but rather merely illustrate a preferred embodiment and structure incorporating the features of the instant invention.

BRIEF DESCRIPTION OF THE DRAWINGS

In the accompanying drawings, forming a part of this specification and wherein like reference numerals are employed to designate like parts:

FIG. 2 is a fragmentary sectional view of the pilot valve mechanism of FIG. 1 illustrating the valve element being moved to one extreme position thereof.

FIG. 3 is a fragmentary sectional view of the pilot valve structure of FIG. 1, illustrating the valve element as being moved to the other extreme position thereof.

DETAILED DESCRIPTION OF PREFERRED EMBODIMENTS

Figure 1:
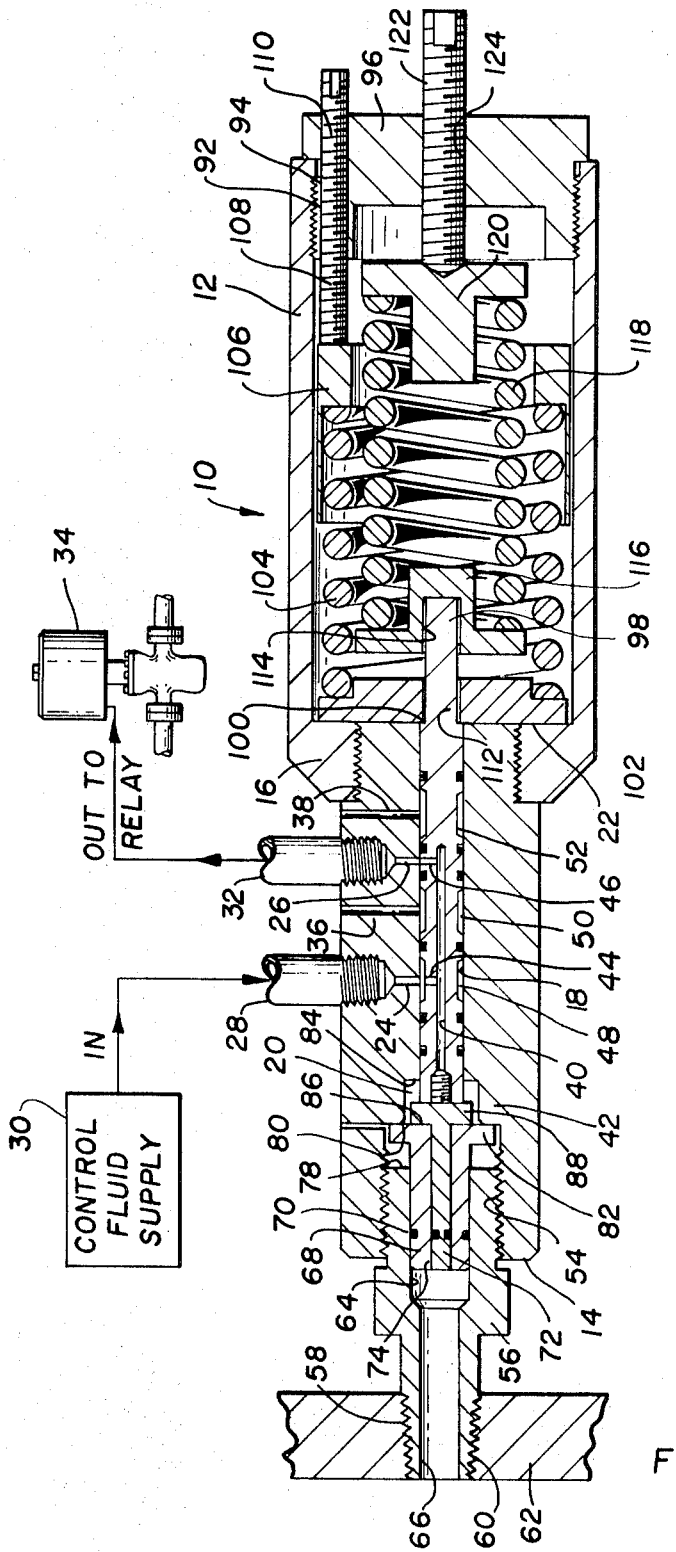
FIG. 1 is a cross-sectional view of a high-low pressure responsive pilot valve mechanism constructed in accordance with the present invention and showing communication thereof to a control fluid supply and to a remotely located actuator in schematic form.

With reference now to the drawings for a better understanding of the present invention, in FIG. 1 a pilot valve mechanism is illustrated generally at 10 that includes a housing composed of body sections 12 and 14 connected together by means of threads 16. The body section 14 is provided with an axial bore 18, defining a valve chamber 20, in which is movably disposed an elongated valve element 22.

The body section 14 is provided with an inlet control fluid passage 24 and an outlet control fluid passage 26, each disposed in fluid communication with the valve chamber 20. The inlet passage 24 is threaded at its outer extremity to receive a supply conduit 28, for the purpose of conducting pressurized controlled fluid from a control fluid supply, illustrated schematically at 30. A conduit 32 is threadedly connected to the body section 14, in fluid communication with the outlet control fluid passage 26, in order to conduct pressurized control fluid from the pilot valve structure to a remotely located actuator 34 capable of controlling a valve or other mechanical device. A pair of exhaust passages 36 and 38, are also formed in the body section 14 communicating the atmosphere or other surrounding medium with the valve chamber 20.

The elongated valve element 22 or valve spool is provided with a blind axial bore 40 that is closed at the outer extremity thereof by a threaded plug member 42. Transverse passages 44 and 46 are formed in the valve element in communication with the axial bore 40 in order to conduct control fluid through the valve element in a manner described hereinbelow. The valve element is provided with a plurality of reduced diameter portions separated by O-rings that cooperate with the bore 18 to define annuluses 48, 50 and 52. The annuluses function cooperatively with the inlet 28, the outlet 32 and the exhaust passages 36 and 38 to control the fluid supply for actuation of the remotely located actuator device 34.

The body section 14 is provided with a threaded bore 54 into which is threaded a threaded extremity of a connector element 56, provided with an externally threaded portion 58 that is adapted to be received by internal threads 60 formed in the wall structure 62 of a conduit or vessel. The conduit or vessel provide a source of pressurized fluid that is to be sensed to determine the particular operational mode of the remotely located actuator. The connector element 56 is provided with an internal piston bore 64 that is communicated with the source of operating fluid pressure through an axial passage 66 formed in the connector element.

An outer piston member 68 is disposed within the bore 64 and is maintained in sealed relation therewith by an O-ring member 70, retained within an annular groove formed in the outer piston member. An inner piston 72 is disposed within an axial bore 74 formed within the outer piston 68, and is maintained in sealed relation with the bore 74 by an O-ring member 76, retained within a groove formed in the inner piston. Axial movement of the piston 68 is limited by stop shoulders 78 and 80 defined on the connector element 56 and the valve body 14, respectively. Shoulders 78 and 80 are engaged by an annular flange 82 formed integrally with the piston 68 to define the limits of movement of the outer piston. Axial movement of the inner piston member 72 is limited by stop surfaces, defined respectively by a shoulder 84 of the valve body and one extremity 86 of the outer piston member 68, that are engaged by an integral flange 88 formed on the inner piston 72. The inner and outer piston members are capable of moving together as a unit from the FIG. 2 position thereof to the FIG. 1 position in response to the application of pressurized operating fluid through the passage 66 at a pressure within a predetermined operating pressure range. The inner piston 72 is capable of movement from its FIG. 1 position to the FIG. 3 position thereof, responsive to transmission of pressurized operating fluid through the passage 66 at a pressure exceeding the operating pressure range at which the pilot valve mechanism is set. The inner piston member 72 is disposed in abutment with one extremity of the valve element 22, thereby causing movement of the valve element axially in response to movement of the piston elements 68 and 72.

It is obvious from the illustrations presented in the drawings that the outer piston 68 presents substantially more surface area in contact with pressurized operating fluid transmitted through the passage 66 than is defined by the cross-sectional area of the piston 72. Considerably more pressure induced force is required, therefore, to impart movement to the inner piston 72 as compared to the outer piston 68. As operating fluid pressure is applied through the passage 66, the inner and outer pistons will move as a unit from the FIG. 2 position thereof to the FIG. 1 position, thereby causing the flange 82 of the outer piston to engage the stop shoulder 80. The inner piston 72 also ceases movement at this position until the operating pressure, transmitted through passage 66, exceeds the maximum for which the valve is set, at which time the inner piston 72 will be allowed to move separately until the flange 88 contacts the stop surface 84.

The body section 12 defines a spring housing having a planar surface 90 defined at one extremity thereof by cooperating portions of body sections 12 and 14. The body section 12 is provided with internal threads 92 at the free extremity thereof, that are adapted to receive an externally threaded portion 94 of a closure member 96 that prevents dust or other contaminants from entering the spring housing.

The valve element 22 is provided with a terminal extension 98 of reduced diameter that extends into the spring housing and defines an annular stop shoulder 100 normally disposed in engagement with a spring retainer member 102. An outer compression spring 104 is retained within the spring housing in engagement with the retainer 102 and is maintained under compression by a spring follower element 106. The position of the follower element 106 is adjustable within the spring housing by a threaded adjustment screw 108 that is threadedly received within a threaded aperture 110 formed in the closure element 96. The terminal portion 98 of the valve element 22 extends through an aperture 112 formed in the spring retainer 102 and is inserted within a blind aperture 114, formed in a second spring retainer 116. An inner spring member 118 is disposed in engagement with the second spring retainer 116 and is maintained under compression by a spring follower element 120. The position of the spring follower 120 is adjustable by a threaded adjustment screw 122 received within a threaded bore 124 formed in closure element 96.

OPERATION

Assuming operating fluid pressure transmitted through the passage 66 to be below a predetermined operating pressure range, the force exerted by the pressure on the combined surface area defined by the cross-sectional dimension of pistons 68 and 72, will be insufficient to overcome compression of the inner spring member 118. The inner spring member 118, therefore, will act through retainer member 116, or the terminal extension 98 of the valve element, thereby forcing the valve element 22 to the left as illustrated in FIG. 2 until the flange 82 of the outer piston 68 engages the stop surface 78. Shifting of the valve element 22 to this position misaligns the transverse passage 46 from the outlet passage 26, thereby causing the O-ring members on either side of the transverse passage to block the flow of control fluid to the outlet passage. Simultaneously, the outlet passage 26 will be disposed in communication with the exhaust passage 38 through annulus 52, thereby allowing fluid pressure to bleed from the actuator 34 through conduit 32 and passage 26 and to be exhausted to the atmosphere through the exhaust passage 38. This feature allows the actuator 34 to be deenergized, thereby allowing the valve element, or other mechanical device with which it is associated, to be moved to a predetermined safe position.

As pressure sensed through the passage 66 increases to a level within the operating range for which the pilot valve construction is set, forces applied to the pistons 68 and 72 by the pressurized operating fluid will be sufficiently great to overcome the biased of inner compression spring 118. When this occurs, the piston members and the valve element 22 will move to the FIG. 1 position thereof. Movement of both of the pistons and the valve element is limited by annular flange 82 of the outer piston 68, which contacts the stop surface 80, thereby limiting movement of the outer piston. The inner piston 72 will not move beyond the FIG. 2 position thereof within the operating pressure range of the pilot valve construction, since the forces applied thereto by the sensed fluid pressure will be insufficient to overcome the combined bias of springs 104 and 118.

When the valve element 22 is shifted to the FIG. 1 position thereof, annulus 48 will be disposed in alignment with the inlet passage 24, thereby allowing control fluid supplied thereto to be conducted through the transverse passage 44 to the axial bore 40 within the valve element. Annulus 50, at this time, will be disposed in fluid communication with the exhaust passage 36, but the O-rings on either side of the annulus 50 will establish positive seals preventing control fluid from reaching the exhaust passage. The other exhaust passage 38 is also blocked by O-rings that are disposed on either side of the annulus 52. Transverse passage 46, within the valve element 42, will be aligned with the outlet passage 26, thereby conducting control fluid from the axial bore through passages 46 and 26 to the conduit 32 supplying control fluid to the remotely located actuator 34.

Assuming that fluid pressure transmitted through the passage 66 exceeds the operating pressure range for which the pilot valve construction is set, forces will be transmitted by the operating fluid pressure to piston members 68 and 72. The outer piston 68 will not be allowed to move beyond the FIG. 1 position thereof, since the annular flange 82 thereof is disposed in the contact with the stop shoulder 80. Forces applied to the inner piston 72 by fluid pressure exceeding the operating pressure range will cause the inner piston 72 to move axially to the FIG. 3 position thereof against the bias of spring members 104 and 118. Forces will be transmitted from the elongated valve element 22 to the spring retainer 102 through shoulder 100 defined on the valve element. The valve element also directly transmits forces through the retainer member 116 to the inner spring member 118. After the valve element has been shifted by the inner piston 72 sufficiently to overcome springs 104 and 118, the inner piston and the valve element will be disposed in their respective positions as illustrated in FIG. 3. The annular shoulder 88 of inner piston 72 will contact the stop surface 84 defined by the valve body, thereby limiting axial movement of the inner piston in this particular direction and, therefore, will also limit movement of the valve element 22 in this direction. After reaching the FIG. 3 position of the valve element, annulus 48 will be disposed in fluid communication with inlet passage 22, thereby communicating pressurized control fluid through transverse passage 44 into axial bore 40 of the valve element 22. Transverse passage 46 of the valve element will be shifted out of communicating alignment with the outlet passage 26 and the O-ring sealing members, disposed on either side of the transverse passage 46, will block communication between the inlet and outlet passages, thereby preventing energization of the remotely located actuator 34. Simultaneously, the exhaust passage 36 will be communicated through annulus 50 with the outlet passage 26, thereby allowing control fluid to flow from the remotely located actuator 34 through conduit 32 where it is exhausted to the atmosphere by the pilot valve. Annulus 52, at this time, will be disposed in fluid communication with the exhaust passage 38, but is blocked from any fluid communication by O-ring members situated on either side thereof.

It is obvious that control fluid will be supplied to the remotely located actuator 34 when the valve element 22 is disposed in the FIG. 1 position thereof, responsive to the application of fluid pressure to the piston members 68 and 72, within a predetermined operating pressure range. In the event fluid pressure transmitted through the passageway 66 should increase above the operating pressure range, such as might occur due to failure of some component part of the processing system, the valve element will be automatically shifted to a position blocking the supply of control fluid and simultaneously exhausting control fluid from the remotely located actuator, thereby allowing the actuator to move the valve or associated mechanical device to a predetermined safe position. Also, it is apparent that a decrease in the operating fluid pressure transmitted through passage 66, such as might occur upon rupture of the line or vessel to which the pilot valve is associated, will result in automatic movement of the valve element to the FIG. 2 position, thereby blocking the flow of control fluid to the remotely located actuator and simultaneously venting control fluid from the actuator to allow movement of the valve or other associated mechanical device to a predetermined safe position.

In view of the foregoing, it is apparent that I have provided a novel pilot valve mechanism that is capable of controlling the flow of control fluid responsive to a sensed pressure and blocking the flow of control fluid in the event the sensed fluid pressure should become excessively high or low. I have also provided the pilot valve mechanism that does not constantly bleed control fluid while the pilot valve structure is in service. My valve construction only bleeds control fluid while exhausting the control fluid from a remotely located actuator after it is being deenergized, thereby obviating the usual constant bleed situation that has been deemed undesirable. I have provided a unique spring arrangement employing a pair of individually adjustable compression spring members that function individually during low-pressure deenergization and coactively during high-pressure deenergization to allow proper controlling movement of the valve element. The spring members are individually adjustable in order to provide a wide range of adjustment of the operating pressure range of the pilot valve. My invention effectively accomplishes movement of a remotely located actuator for valves or other mechanical devices to a predetermined safe position in the event the process pressure that is sensed becomes excessively high or excessively low and thereby prevents rupture or other damage to a processing system with which the pilot valve assembly is associated. It is also apparent that I have provided a novel high-low pressure responsive pilot valve mechanism that is simple in nature and low in cost, even though it is capable of accomplishing the results set forth hereinabove. My invention, therefore, is well adapted to attain all of the objects and advantages hereinabove set forth together with other objects and advantages that are inherent in the apparatus itself. While certain representative embodiments and details thereof have been shown for the purpose of illustrating my invention, it will be apparent to those skilled in the art that various changes and modifications may be made therein without departing from the spirit or scope of my invention.

Having thus clearly shown and described my invention, I claim:

1. A pilot valve mechanism comprising a valve body defining a valve chamber, a valve element being movably disposed within said valve chamber, said valve body having control fluid inlet and outlet means in fluid communication with said valve chamber, said housing having control fluid exhaust means in communication with said valve chamber, said valve body having a pressure-sensing inlet, means biasing said valve element to a first position responsive to sensing of pressure below a predetermined minimum pressure where said control fluid inlet is blocked and said control fluid outlet is communicated with said control fluid exhaust means, means moving said valve element to a second position responsive to the sensing of a predetermined pressure at said pressure-sensing inlet, thereby communicating said control fluid inlet and outlet means and blocking said control fluid exhaust means, means moving said valve element to a third position responsive to sensing of excessive pressure at said pressure-sensing inlet, thereby causing blocking of said control fluid inlet and communication of said control fluid outlet with said control fluid exhaust means.

2. A pilot valve mechanism as recited in claim 1, said means biasing said valve element comprising a pair of compression spring members one of which controls movement of said valve element to said first position and both of which are overcome during movement of said valve element to said third position.

3. A pilot valve mechanism as recited in claim 2, means for individually adjusting each of said springs.

4. A pilot valve mechanism as recited in claim 1, said means moving said valve element to said second position comprising piston means of large surface area, said means moving said valve element to said third position comprising piston means of small surface area.

5. A pilot valve mechanism as recited in claim 4; said piston means of large surface area comprising a pair of pistons functioning is concert to define said large surface area, said piston means of small surface area comprising one of said pair of pistons.

6. A pilot valve mechanism as recited in claim 5; said means biasing said valve element comprising a pair of compression springs, said piston means of large surface area being operative to overcome the bias of one of said compression springs, sand piston means of small surface area being operative to overcome the combined bias of both of said compression springs.

7. A pilot valve mechanism comprising a valve body defining a valve chamber and having control fluid inlet and outlet means disposed in fluid communication with said valve chamber, a valve element movably disposed within said valve chamber, said valve body having fluid exhaust means communicating said valve chamber to the atmosphere, said valve body having a pressure-sensing inlet, a pair of concentric pistons disposed within said pressure-sensing inlet and being responsive to pressure communicated into said pressure-sensing inlet to impart movement to said valve element, a pair of compression springs disposed within said valve body and normally biasing said valve element toward said pistons, said valve element being movable by one of said springs to a first position responsive to the application of fluid pressure to said pistons below an operating pressure range thereby causing said valve element to block the flow of control fluid into said valve chamber and communicating said control fluid outlet with said exhaust means, said valve element being movable by said pistons to a second position against the bias of said one spring responsive to application of fluid pressure to said pistons at a predetermined operating pressure range, thereby communicating said control fluid inlet and outlet means and blocking said exhaust means, said valve element being movable to a third position responsive to the application of fluid pressure to said pistons above said operating pressure range thereby blocking said control inlet means and communicating said control fluid outlet means with said exhaust means.

8. A pilot valve mechanism as recited in claim 7; said valve body having means for individually adjusting said compression springs.

9. A pilot valve mechanism as recited in claim 7, said valve body defining stops for the outer concentric pistons, said outer piston having a flange thereon disposed to engage said stops to limit axial movement of said outer piston, said valve body defining a stop to limit axial movement of the inner one of said pistons in one direction thereof, said outer piston limiting movement of said inner piston in the other direction thereof.

10. A pilot valve mechanism as set forth in claim 7; said valve element having a stop shoulder defined thereon, a first spring retainer engaging said stop shoulder, a second spring retainer engaging said valve element, one of said compression springs engaging said first spring retainer and the other of said compression springs engaging said second spring retainer, a retainer stop shoulder defined within said valve body, said first spring retainer engaging said retainer stop shoulder during application of fluid pressure at and above said operating pressure range, said other of said springs moving said stop shoulder of said valve element out of contact with said first spring retainer at fluid pressures below said operating pressure range.

11. A pilot valve mechanism as recited in claim 10; a pair of spring followers disposed in engagement with respective ones of said compression springs; adjustment screws carried by said valve body and engaging respective ones of said spring followers, whereby the compression of each of said springs may be adjusted in order to adjust the operating pressure range of said pilot valve mechanism.

* * * * *